(12) United States Patent
Jacobs

(10) Patent No.: US 6,775,032 B2
(45) Date of Patent: Aug. 10, 2004

(54) APPARATUS AND METHOD FOR HALFTONE HYBRID SCREEN GENERATION

(75) Inventor: Timothy W. Jacobs, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 236 days.

(21) Appl. No.: 09/794,440

(22) Filed: Feb. 27, 2001

(65) Prior Publication Data

US 2001/0030769 A1 Oct. 18, 2001

Related U.S. Application Data

(62) Division of application No. 09/075,042, filed on May 8, 1998, now Pat. No. 6,252,675.

(51) Int. Cl.[7] .................................................. H04N 1/23
(52) U.S. Cl. ...................................... 358/3.14; 358/3.06
(58) Field of Search ............................... 358/3.13–3.22, 358/1.9, 3.06, 453, 462; 382/237, 173, 176, 239

(56) References Cited

U.S. PATENT DOCUMENTS

| | | | |
|---|---|---|---|
| 4,194,221 A | | 3/1980 | Stoffel .......................... 358/283 |
| 5,200,831 A | * | 4/1993 | Tai ............................... 358/3.14 |
| 5,293,430 A | | 3/1994 | Shiau et al. ................... 382/42 |
| 5,341,226 A | | 8/1994 | Shiau ............................ 358/518 |
| 5,357,344 A | * | 10/1994 | Kasamatsu et al. .......... 358/3.21 |
| 5,765,029 A | | 6/1998 | Schweid et al. .............. 395/61 |
| 5,805,734 A | * | 9/1998 | Ebner .......................... 382/237 |
| 5,850,474 A | | 12/1998 | Fan et al. ..................... 382/173 |
| 6,181,829 B1 | | 1/2001 | Clark et al. .................. 382/273 |
| 6,252,675 B1 | * | 6/2001 | Jacobs ........................ 358/1.9 |

* cited by examiner

Primary Examiner—Thomas D. Lee
Assistant Examiner—Stephen Brinich
(74) Attorney, Agent, or Firm—Christopher D. Wait

(57) ABSTRACT

The present invention is a method and apparatus allowing the application of two or more distinct halftone types in the rendering of a single image. The invention employs a halftone selector of a threshold type, or as an alternative a segmenter type. The halftone selector determines which areas of an image will receive which type of grayscale halftone treatment on a pixel by pixel basis. Examples of various halftone types include stochastic, clustered dot, line screen, and other high addressability types. Each pixel of data is treated by the appropriate halftoner circuit which in response outputs digital data. A controller circuit remaps the digital data into the appropriate width and position signals for a pulse width position modulator, including any other signals as needed for any additional inverter circuitry. The pulse width position modulator generates a video signal which may be inverted by the inverter circuit as responsive to the controller circuit remapping determination. This final video signal is provided to an image output terminal.

9 Claims, 3 Drawing Sheets

APPARATUS AND METHOD FOR HALFTONE HYBRID SCREEN GENERATION

This application is a divisional of Application(s) No(s). 09/075,042, filed May 8,1998 now U.S. Pat. No. 6,252,675.

BACKGROUND OF THE INVENTION AND MATERIAL DISCLOSURE STATEMENT

The present invention relates to processing an image signal utilizing pulse width position modulation techniques in combination with multiple halftone processes to improve that image for reproduction.

Many printing devices are not capable of reproducing gray scale images because they are bi-level. As a consequence, binary representation of gray scale images is a requisite in a wide range of applications such as laser printers, facsimile machines, lithography (newspaper printing), liquid crystal displays and plasma panels. Gray scale images are typically converted to binary images utilizing halftone techniques. Halftoning renders the illusion of various shades of gray by using only two levels, black and white, and can be implemented either digitally (facsimile machines, laser printers) or optically (newspaper printing).

Most information display devices are binary in nature, whereas most images are continuous in tone. Therefore, the ability to display continuous tone images on binary devices is very useful. However, the problem of optimally displaying continuous images in a binary form remains unsettled. This problem arises in many forms of media transfer, from graphic arts to facsimile machines. Virtually all printed images in books, magazines, newspapers, etc. are composed in a binary nature. Computer hard copy devices are almost exclusively binary in nature. The process of transforming continuous gray scale information into binary information which is perceived to contain a continuous tone, is called halftoning.

A continuous image is one that can be defined as "natural". It is one which contains indistinguishable transitions from one gray level to the next. A binary image is one that is composed of picture elements that are either black or white. Therefore, the display of a gray scale image on a binary output device requires that the continuous image be quantized into two levels.

Desirable halftone algorithm characteristics include: implementation simplicity; reproduction accuracy for both low frequency (or constant) and high frequency (or edges in fine detail); and the absence of visual artifacts such as low frequency Moiré pattern (aliasing) and false quantization contours (artificial boundaries). Essentially, the desired result of the halftoning process is such that the halftone images observed at normal viewing distances of 30–45 centimeters show dot dispersion which is perceived as varying gray levels, while the underlying dot structure remains unnoticed.

Ordered dither is a halftone technique which represents continuous tones with clusters of dots arranged to give darker or lighter patterns. Input values are compared against a fixed sized screen, and dots are added to the dither lattice with increasing gray levels. Ordered dither techniques include white noise, cluster-dot and dispersed-dot. The disadvantages of ordered dither algorithms include loss of most fine detail and the introduction of periodic artifacts. See Digital Halftoning by R. Ulichney, MIT Press, Cambridge, Mass. (1987).

The major ordered dither techniques are the clustered-dot dither and dispersed-dot dither techniques. Stochastic halftoning processes are possible but will be addressed later. Of the two techniques, clustered dot is by far the most used, since it reproduces well with xerographic and similar electrostatically based printing technologies. Both of those techniques are based upon a threshold array pattern that is of a fixed size. For example, 6×6 threshold arrays may be compared with the digital input values. If the input digital value is greater than the array pattern number, a 1 is produced and, if it is less, a 0 value is assigned. The number of levels that can be represented using either technique depends on the size of the array. For example, a 6×6 array can produce 36 unique levels. However, the larger the array the lower the scan frequency, and hence the greater the loss in picture detail.

When assessing the quality of a binary xerographic printer, two measures are important: the halftone frequency (i.e. number of halftone cells per linear inch), and the number of distinguishable gray steps. To produce a copy of a picture with a just acceptable degree of halftone graininess requires at least 65 halftone cells per inch measured along a diagonal of the page. Good quality halftones require about 100 cells/inch, while high quality magazines typically use 150 cells/inch or higher. The needed number of distinct gray steps in the pictorial copy depends upon the eye's ability to distinguish closely spaced grays. A rule of thumb in the printing industry is that an acceptable picture should contain about 65 gray steps. For good quality, 100 or more steps are desired. However, in a binary printer, the maximum number of output gray steps is limited to the number of pixels per halftone cell (p), plus 1. Thus for a typical 8 by 4 rectangular halftone cell, p+1=33 output gray steps. Higher halftone frequencies have fewer pixels per cell and therefore produce fewer gray steps. This is the fundamental limitation of binary printers.

More levels can be achieved with larger patterns, however, a reduction in the effective resolution occurs because the ability to transition among levels is at a coarser pitch. At the pixel rate of about 300 to 600 per inch, which is the average pixel rate of copiers and laser printers, the pattern artifacts are visible for screen patterns larger than 4×4, and, since 16 levels do not provide an adequate precision for typical continuous-tone imagery, a suboptimal resolution is usually obtained.

Line screening is another halftoning technique. Utilizing a raster output scanning (ROS) approach in combination with pulse width modulation (PWM) techniques, line screens enjoy good detail resolution and freedom from moiré problems. This is particularly so when extended into high addressability (HA) by use of pulse width position modulation techniques (PWPM). High addressability is characteristic of a system with sub-pixel addressability. This is achieved with PWPM by using a laser with a spot size significantly smaller than a pixel, and by using positioning circuitry capable of starting and stopping the laser pulse at sub-increments of a pixel. This further increases the detail resolution of the system.

However, there are still difficulties with line screens and PWPM, in rendering faithful or pleasing copies of continuous tone originals. The usual discharge characteristic of the photoconductor and solid area developability of the xerographic development system combine to yield a Tone Reproduction Curve (TRC) with a steep slope and a narrow range. At one end of the gray scale spectrum there is a finite limit in the smallest amount of charge that can be developed and attendant limitations in the minimum amount of toner which can be expected to adhere to that charge. At the other end of the gray scale spectrum there is a point at which the volume of toner developed swamps out the small undeveloped areas. The result is a copy with washed out highlights and over-developed shadows.

One technique applied to this problem is taught in U.S. Pat. No. 5,587,772 to Arai et al. Disclosed here is a pulse width modulation system where the clock frequency for a line type halftoner is toggled between two frequencies, utilizing lower frequency line types to overcome cost and provide improved natural image quality without sacrificing character image quality. A discrimination device determines whether an image density signal belongs to a line image or to a natural image portion of an image. The discrimination device provides a signal to select from two image density conversion devices. The first image density conversion device having a image conversion property for application to most of the image density range except the low density portion. The second image density conversion device having a second conversion property different from the first and for converting a range of image density signal corresponding to a low density portion. A pulse width modulation device modulates the conversion signals output from the first and second image density conversion devices and provides a pulse width modulation signal. A pulse width modulation signal period changing device is provided for changing the period of the pulse width modulation device output from the pulse width modulator and the period of selection in accordance with the discrimination signal output from the image density signal discrimination device. The main purpose of the apparatus is to realize line-reduction owing to the property of one of the conversion means that the conversion means outputs a value within a range corresponding to portions where the electrostatic latent image is not developed.

Stochastic screen is yet another halftoning technique. A stochastic halftone cell is a large threshold array that produces random appearing patterns in the halftone image. One of the advantages of stochastic, or non-periodic screening over periodic screening is the suppression of moiré. However it has a less desirable image quality, having higher image noise which leads to more grainy looking images than for example, clustered dot. U.S. Pat. No. 5,673,121 discloses an idealized stochastic screen, characterized by all of the predominant color dots (black or white) being uniformly distributed. The invention seeks to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is iterated until the desired result is obtained. It should be noted that stochastic screens are very desirable in implementing digital watermarks as taught in U.S. Pat. No. 5,734,752 to Knox, and incorporated by reference herein.

In U.S. Pat. No. 5,394,252 to Holladay et al., discloses an image processing system for preparing a color document for printing. Where each discrete area or pixel in the image is described by a signal having a number of possible states or color separations. Each separation of the image is halftoned, with at least one of the separations processed with a non-periodic halftoning method, and at least one of the remaining separations processed with a periodic pattern. Preferably, this is performed in a printer printing with colorants approximating cyan, magenta, yellow and black, where one of the non-yellow separations is processed with the non-periodic halftoning method. The teaching here is the avoidance of moiré and color degradation due to spatial shifting by applying different halftone techniques to different separations. Advantage is made of utilizing different halftone techniques upon different separations where one image separation is printed over top another. However, no solution is provided to address the need for applying different halftone types to different segments or density areas within a single separation or image.

As may be noted from the discussion above, while there are many halftone techniques, they all posses strengths and weaknesses. Therefore, it would be desirable to have a method and apparatus which would allow the combination of different given halftone techniques with their attendant strengths to be applied to correspondingly appropriate segments within an image.

SUMMARY OF THE INVENTION

The present invention is directed to an apparatus and method to enable maximum picture contrast, highlight, shadow, and color fidelity while retaining the maximum picture detail in a digital image.

In accordance with the invention, there is provided method and apparatus to enable hybrid screening with the mixing of multiple halftone types including though not limited to stochastic, line screen, and clustered dot types, any or all within a single digital image.

In accordance with the invention, there is provided method and apparatus to enable the maximum image detail resolution but allow the inclusion of digital watermarking.

More particularly, the present invention relates to a combination of a selector circuit and high addressability halftone converter circuits. Each halftone converter circuit implements a distinct type of halftone conversion. The halftone conversion is performed on a pixel by pixel basis. The selector circuit determines which halftone conversion is to be used for a given pixel of data. In one embodiment the selector circuit determination is dependent upon the given pixel data value. In an another embodiment the determination results from the output of a segmentation algorithm.

DESCRIPTION OF THE INVENTION

Figure 1:
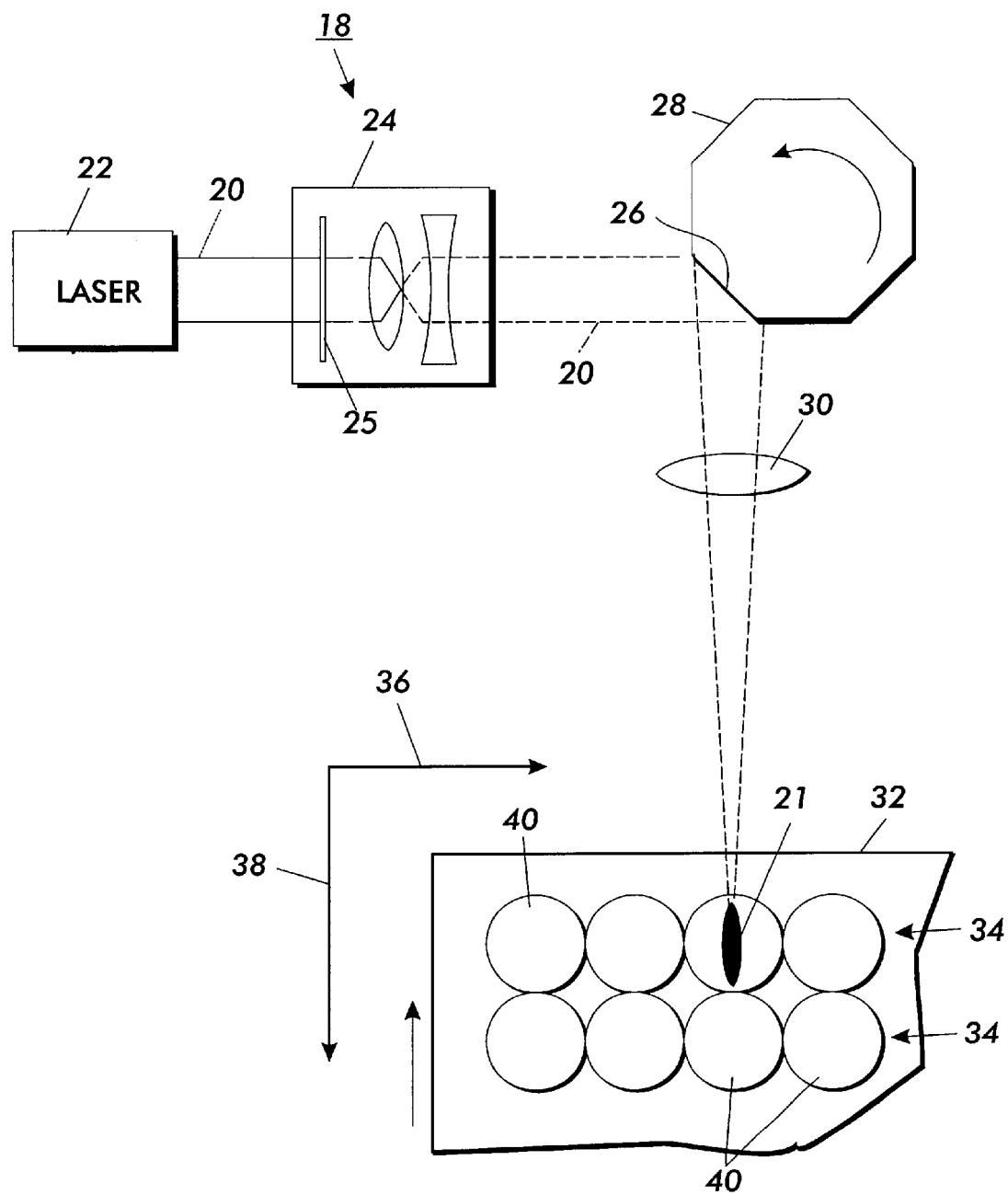
FIG. 1 is a schematic illustration of a Raster Output Scanner (ROS), illustrating a portion of the photosensitive image plane.

For a general understanding of the present invention, reference is made to the drawings. In the drawings, like reference numerals have been used throughout to designate identical elements. FIG. 1 shows a raster output scanner (ROS) which may be used to print video signals produced by a source (not shown). There are two common types of ROS 18, flying spot and pulse imaging ROSs. In both, a laser beam 20, emitted from laser 22, passes into conditioning optics 24 which includes a modulator 25. For precise periods of time, determined in response to video signals supplied to ROS 18, modulator 25 either blocks or deflects the laser beam, or allows to the beam to pass through the conditioning optics to illuminate a facet 26 of rotating polygon 28. Laser 22 may be a helium-neon laser or a laser diode. In the latter case, the video data would directly modulate the laser rather than modulator 25. In addition, more than a single laser source 22 or beam 20 could be employed to practice the invention.

After reflecting off facet 26, laser beam 20 passes through conditioning optics 30 and forms a spot 21 on photosensitive image plane 32. The rotating facet causes laser spot 21 to scan across the image plane in a line 34. Line 34 lies in what is commonly referred to as the fast scan direction, represented by arrow 36. In addition, as facet 26 rotates, image plane 32 moves in a slow scan direction, substantially perpendicular to the fast scan direction, as represented by arrow 38. Movement in the slow scan direction is such that successive rotating facets of the polygon for successive scanlines 34 that are offset from each other in the slow scan direction.

Each scan line 34 includes a row of pixels 40, wherein the pixels are produced by the modulation of the laser beam as laser spot 21 scans across the image plane. As beam 20 scans across the scanline, pixel spot 21 either illuminates or does not illuminate the individual pixel, in accordance with the video signals provided to ROS. In general, the video signals may be characterized as a serial stream of binary pulses, where a logic one or a pulse specifies that the beam is to illuminate the surface, while a logic zero, no pulse, will result in no illumination.

For both types of ROS, the width of pixel 40 is dependent upon the period or duration of the corresponding logic one pulse in the video signal supplied to ROS 18. In a scanning spot ROS, at the leading edge of a pulse modulator 25 allows the passage of laser beam 20 onto the image plane. For the duration of the pulse, and oval shaped laser spot 21 is scanned across image plane 32, illuminating at least one addressed pixel 40 within the scan line 34. The width of the illuminated region in the fast scan direction thus depends on the duration of the video pulse, as well as on the width and scanning rate of laser spot 21. Typically, the dimensions of the laser spot are such that it is two to three times taller in the slow scan direction than its width in the fast scan direction. As an example, in a 600 spi, 135 ppm, dual beam printer, the laser spot is approximately 43 $\mu$m high and 20 $\mu$m wide, and the time period required for the spot to scan across the width of a single pixel 40 is about 15 nanoseconds.

Typically, the video data used to drive the ROS is clocked so that the period within which each pixel is exposed, referred to hereafter as a pixel clock period, is the same. In addition, the video data used to generate the video signal pulses which drive the modulator are also synchronized with ROS 18 and the movement of the image plane 32 in the slow scan direction, thereby allowing a particular bit of video data to address an appropriate portion of image plane 32. The synchronization of the video data, the video signal pulses produced therefrom, the ROS and the image plane is achieved through the use of a system clock that is equivalent to the rate at which pixels must be exposed on the image plane. Without more, this arrangement limits the addressability for a particular bit of video data to a selected pixel location. This is referred to as the inherent addressability. The system clock frequency is the same as the effective pixel frequency. Using a system clock running at a higher frequency than the effective pixel frequency allows sub-pixel addressing. Such an ability when present is referred to as High Addressability (HA). While faster clocks may allow greater resolution within the video pulse stream, a higher frequency also results in increased costs for faster hardware within the video processing path. A technique to allow HA without the need for faster hardware is pulse width position modulation.

In the following embodiment, a pulse width and position modulator (PWPM) is utilized to form the video signal pulses in response to video data representing the image to be printed. PWPM techniques are well known in the art. Exemplary examples of which are provided in U.S. Pat. No. 5,184,226 and U.S. Pat. No. 5,504,462 both incorporated by reference herein. The present invention is directed to enabling a PWPM System to provide a variety of halftone types within a single image while responsive to the video data. In this manner the best attributes of different halftone types are mixed enabling a digital image that maximizes both image detail as well as the highlights, shadows and color fidelity in an image. It should be noted that while the following description is directed toward a single color output, there is no intent to limit the application of the present invention in such a manner.

Figure 2:
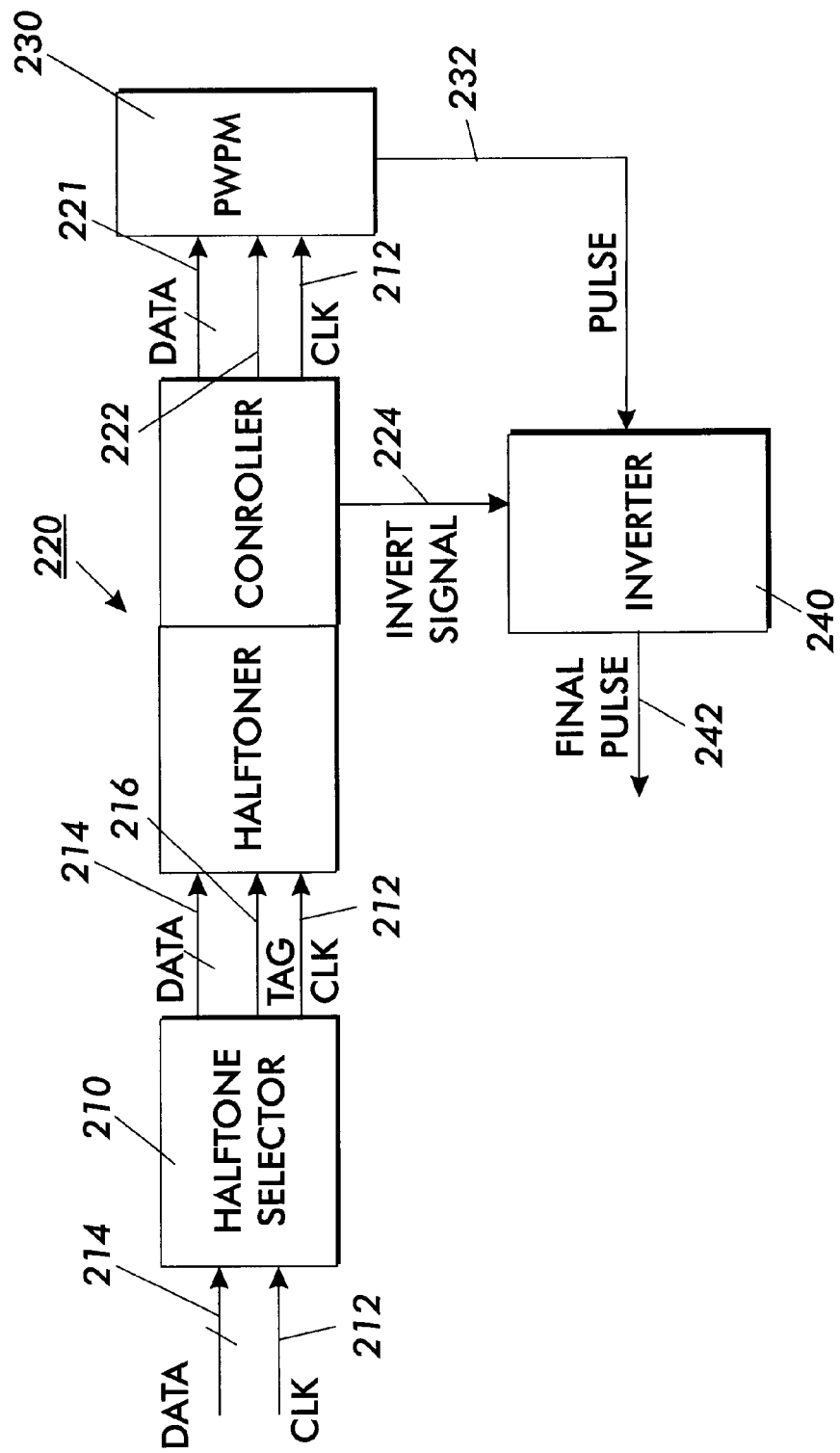
FIG. 2 is a schematic illustration of a preferred embodiment for the invention.

Turning now to FIG. 2, depicted is a preferred embodiment of the invention, a pipeline implementation. Halftone selector 210 receives as input pixel clock 212, and pixel data 214. Each new byte of pixel data 214 is latched into the halftone selector 210 with each toggling of the pixel clock 212. A byte of pixel data 214 is then examined in the halftone selector 210. In a preferred embodiment, examination of a byte of pixel data 214 involves comparing its numerical value as against two empirically derived threshold values. Any byte of pixel data 214 with a numerical value below or equal to a first threshold value is assigned a unique tag value. Any byte of pixel data 214 with a numerical value above or equal to the second threshold value is assigned the same tag value. All other bytes of pixel data 214 with values in-between receive an alternative tag value. In a preferred embodiment the threshold values are set to approximately 12.5% and 87.5% of the desired gray scale range. This allows the lightest and the darkest (or highest and lowest density) ranges to be tagged as distinct from a middle gray scale range.

In an alternative preferred embodiment the utilization of segmentation techniques are employed by the halftone selector 210 in the examination of pixel data 214. Segmentation techniques in the imaging arts are commonly known and practiced. Segmentation allows the differentiation of text as from pictorial information, as well as the identification of shapes, edges, and other sub-area image data of interest. One example is found in U.S. Pat. No. 5,327,262 the disclosure of which is incorporated by reference herein. The teaching contained therein is directed to dealing with noise found in images. However, similar techniques can be used to isolate highlight and shadow areas as well.

The appeal in employing segmentation techniques within the present invention is to allow the identification of very low and very high density sub-areas within a given image. Such image sub-areas will best respond to application of lower frequency cluster dot type halftones and benefit from the improved range of grayscale halftones and color tone fidelity attributable to those types. In this way emphasis is given to areas at the extremes of lightness and darkness for monochromatic images, or the extremes of color saturation for chromatic images. A unique tag value is assigned to the pixel data 214 found in such image sub-areas as identified by the segmenter, with an alternate tag value assigned for all remaining pixel data 214.

Further alternatives, as apparent to one skilled in the art may be employed in the operation of halftone selector 210. As yet another example, tag generation may be driven by graphic software where a particular halftone type is elected so that a desired artistic or visual effect may be realized. Never-the-less, in any version of halftone selector 210, including the threshold type or the segmenter type, an appropriate tag 216 is generated for each byte of pixel data 214.

On the next toggle of pixel clock 212, the pixel data 214 and tag 216 are made available and latched into the halftoner and controller 220. In a preferred embodiment, the halftoner is a high addressability clustered dot type of halftoner. The controller functions include data remapping, pulse position and inversion signal generation.

In one example, halftoner and controller 220 when presented with a tag 216 indicating the pixel data as being found between the upper and lower threshold values, will line screen the associated pixel. Line screening is performed by alternating the position pulse 222, fully left justified, then fully right justified, then left again, etc. and feeding the pixel data into the data lines of the PWPM device 230. Where the pixel data value translates directly into the pulse width, the toggled position pulse 222 sets the video pulse position to either full left or full right justification. This creates a line screen with a frequency of one half of the Image Output Terminal (IOT) spots per inch or one half the pixel clock rate. This would mean for example that a 300 line frequency line screen can be generated from 600 spot per inch pixel data. In operation this means that the pixel data 214 is passed unmodified directly into the PWPM 230 but coupled with a generated toggled position pulse 222. In a further example, an immediately subsequent pixel of data 214 with the same tag 216 value would invoke nearly the same halftoner and controller 220 response. Once again the pixel data 214 is passed unmodified directly into the PWPM 230 along with a toggled position pulse 222. However, the toggle position pulse 222 would now indicate the alternative position value and thus the justification applied to video pulse 232 shifts from fully right justified to fully left justified, or from left to right as the case may be, alternating from whatever its prior justification was.

In the alternative example, halftoner and controller 220 is presented with a tag 216 indicating the pixel data as being found below or above the upper and lower threshold values, and therefore a different grayscale halftone technique is applied to the pixel data 214 in a manor distinct from the above line screen technique. There are many different grayscale techniques which may be applied. Table 1 shows one example of how a number of various grayscale techniques may be rendered operable utilizing pulse width modulation techniques and in particular PWPM.

TABLE 1

High Addressability Mapping to PWPM

| HA halftoner Pixel output Data | PWPM Video Pulse | Invert Signal | Remapped Pixel Data (Decimal) | Position Data (Binary) |
|---|---|---|---|---|
| 0(0000) | 0 | | 0 | XX |
| 1(0001) | R¼ | | 64 | 11 |
| 2(0010) | C¼ | | 64 | 00 |
| 3(0011) | R½ | | 128 | 11 |
| 4(0100) | C¼ | | 64 | 00 |
| 5(0101) | NA (R½) | | 128 | 11 |
| 6(0110) | C½ | | 128 | 00 |
| 7(0111) | R¾ | | 192 | 11 |
| 8(1000) | L¼ | | 64 | 10 |
| 9(1001) | C½ | X | 128 | 00 |
| 10(1010) | NA (L½) | | 128 | 10 |
| 11(1011) | C¼ | X | 64 | 00 |
| 12(1100) | L½ | | 128 | 10 |
| 13(1101) | C¼ | X | 64 | 00 |

TABLE 1-continued

High Addressability Mapping to PWPM

| HA halftoner Pixel output Data | PWPM Video Pulse | Invert Signal | Remapped Pixel Data (Decimal) | Position Data (Binary) |
|---|---|---|---|---|
| 14(1110) | L¾ | | 192 | 10 |
| 15(1111) | 1 | | 255 | XX |

For the purpose of discussion, the examples of allowable pixel data output from a halftoner as shown in Table 1 are limited to a four bit range of 16 possible combinations. These run from zero, no video pulse, to fifteen which equates to a video pulse width which is on for an entire pixel clock period. The first column of Table 1 lists the sixteen possible combinations. Because here these combinations manipulate pulse widths which are one quarter of the pixel clock period and address them into any quarter pixel, they are considered high addressability halftone data.

The second column of table 1 shows the PWPM interpretation given to the halftoner output listed in column one. A PWPM can only normally output a single pulse, consisting of first a rising edge followed by a failing edge. The width of the pulse may be ¼, ½, ¾, or the full width of the pixel in the Table 1 example. These pulse widths correspond to pixel data values of 64, 128, 192 and 255 respectively (expressed in decimal notation) as remapped for input into the PWPM. This is shown in column four of Table 1. The ¼, ½, ¾, pulse examples may be left (L), right (R), or center (C), justified as determined by the two bit position data as listed in column five of Table 1. A PWPM is normally limited to generating a rising pulse edge followed by a falling pulse edge. So there are some combinations which are not possible for the PWPM to provide. Combination examples 9, 11, and 13, may never-the-less be achieved by toggling a selectable analog inverter circuit as provided on the output of the PWPM when used in conjunction with the remapped pixel and positional data as shown in the Table 1. Finally there are two pulse width, position combinations listed in the table which the PWPM cannot do, examples 5 and 10. That is because these combinations require at least three pulse edges, a thing which a conventional PWPM cannot do. It is unlikely that such a combination would be required from customary halftoners, but if needed the combinations may be approximated by the PWPM pulse as parenthetically shown in Table 1.

Returning now to FIG. 2 and our alternative example, where the halftoner and controller 220 is presented with a tag 216 indicating a different grayscale halftone technique is to be applied to incoming pixel data 214. The halftoner portion of the halftoner and controller 220 must now grayscale the pixel data 214 into halftone data instead of simply passing it on. In a preferred embodiment, the grayscale technique applied to the pixel data 214 is a cluster dot halftone. Cluster dot halftone grayscaling is common and well understood in the imaging arts. Exemplary examples of which are found in U.S. Pat. Nos. 4,149,194, and 4,185,304 both of which are incorporated by reference herein. The gray level value of a pixel of data is compared against a threshold value as found in a threshold array stored in memory. Depending upon the result, the appropriate halftone data is provided. In an preferred embodiment this is a four bit nibble as listed in the first column of Table 1. This four bit nibble is passed on to the controller section of halftoner and controller 220. The controller remaps the four bit nibble into the appropriate PWPM 230 input data 221 and position data 222 as shown in columns four and five of Table 1 respectively. In addition, as needed the controller section of halftoner and controller 220 will generate invert signal 224 for an analog inverter circuit 240.

With either of the above examples of tag 216 toggle position, the PWPM 230 latches in data 221 and position data 222 on the next clock pulse 212. The PWPM then generates video data 232 which is sent to inverter 240. The output of analog inverter 240 is final video pulse 242.

Figure 3:
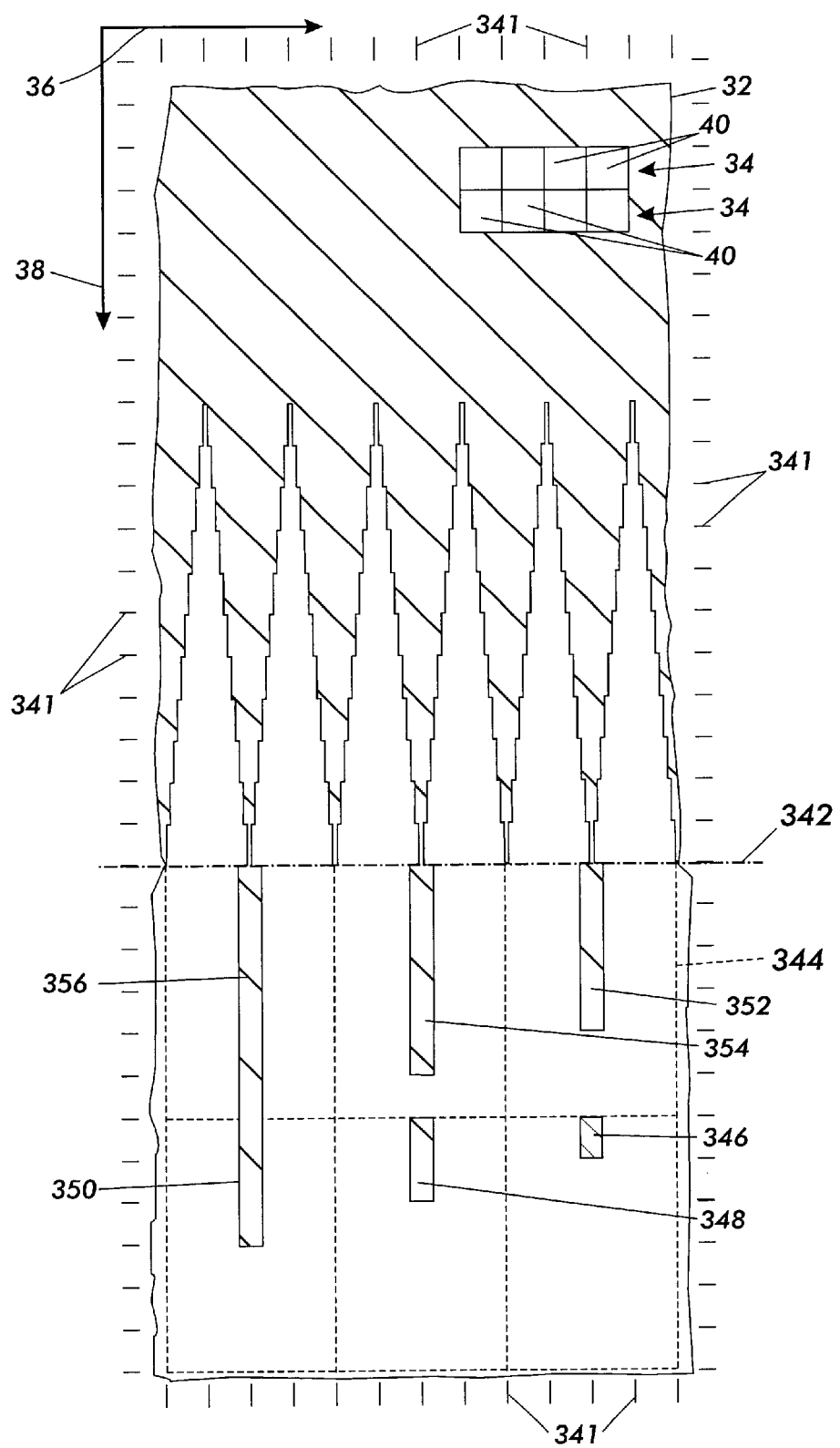
FIG. 3 is a portion of the photosensitive image plane schematically depicting a transition in image density passing through a threshold and the resulting change in halftone type.

FIG. 3 depicts the result of applying a preferred embodiment approach as image density varies on image plane 32. The arrow 36 represents the fast scan direction and arrow 38 represents the slow scan direction. A multiplicity of pixel 40 are arranged in rows and thereby compose scan lines 34. Tic marks 341 are provided as indicia of the pixel grid and aid in delineating the row and column arrangement of pixels. In a preferred embodiment a transition of halftone type occurs at approximately the 12.5% image density point. As an aid to understanding, indicia of the transition point is provided here by line 342. The halftone data above line 342 is rendered utilizing line screen techniques. The halftone data found below line 342 is rendered utilizing a preferred embodiment clustered dot technique.

Dotted lines are provided to indicate a preferred embodiment clustered dot halftone cell 344. The halftone cell 344 is a matrix four pixels 40 wide and six pixels 40 high. The clustering starts in the center of the first row and builds up row by additional row. This yields a six step gradation in tone between zero density and a preferred embodiment 12.5% density threshold. The cluster dot result 346 is an example of the minimum density and size dot for this embodiment. Cluster dot result 346 is an indication of image density running at approximately 2%. This dot is built using Table 1 examples 1 and 8 to derive right and left justified quarter width PWPM pulses R¼ and L¼. The R¼ pulse is placed in the 1st row, 2nd pixel location, and the L¼ pulse is placed in the 1st row, 3rd pixel location. This effectively yields a centered half width pulse as shown in FIG. 3, cluster dot result 346. Incremental increases in image density are further provided with cluster dot results 348, 350, 352, 354, and finally 356 where a density of approximately 12.5% is reached. While the cluster dot technique employed here is capable of densities greater than this, in a preferred embodiment such as this, higher densities will be rendered with a line screen halftone technique as directed by the halftone selector 210. Thus a wider cluster dot result will not be applied. However, note that cluster dot result 350 by virtue of starting immediately where cluster dot result 356 has finished creates in effect a larger apparent dot.

The advantage of utilizing the clustered dot halftone technique described above is in the improved rendering of image highlight and shadow. This is achieved by relieving the system of the need to develop very small areas and hold very small amounts of toner together on a photosensitive image plane 32 (or the inverse at the opposite end of the density spectrum—development which leaves very small areas undeveloped with very small areas without toner). The area of toner is larger, but the ratio of toner to non-toner area is smaller. The eye will blend the ratio of areas and perceive a lightening of tone density. This is useful in image segments with little detail or only gradual sifts in gray scale. It is also particularly useful in color systems where the eye will blend the small areas of color toner together, much as the French painter Seurat demonstrated with his pointillistic artwork. In this manner the system will appear to be yielding better color fidelity because the intended ratio amongst the primary colors is better preserved.

Differing advantages may be realized by utilizing different halftone techniques as would be appreciated by one skilled in the art. For example as a further preferred embodiment, a stochastic halftone technique may be employed to yield two possible improvements. Stochastic screens have been shown of value in digital watermarking. With the present invention, a line screen approach could be maintained in areas of image detail while with a change in halftone, other shaded areas may receive a watermark. Secondly, stochastic halftoning is attributed in black and white conversions of color images as providing a better sense of fidelity with the original. This may also be of particular value in graphic design systems with the rendering of mechanical and other types of generated drawings. All of the above and other alternative combinations and variations suggested by the teaching contained herein are considered as encompassed in the present invention.

While the embodiment disclosed herein is preferred, it will be appreciated from this teaching that various alternative, modifications, variations or improvements therein may be made by those skilled in the art, which are intended to be encompassed by the following claims.

What is claimed is:

1. An apparatus for halftone hybrid screen generation, comprising:
    a video input, receiving video signals corresponding to gray scale pixel data in an image;
    a first halftoner, halftoning gray level pixels;
    a second halftoner, halftoning gray level pixels in a manner distinct from the first halftoner;
    a selector, using a segmenter on the gray level pixels to identify pictorial information as differentiated from text information;
    a halftone selector employing threshold comparisons to detect the high and low image density areas of those gray level pixels identified as pictorial information, and thereby direct which halftoner to use on a pixel.

2. The apparatus for halftone hybrid screen generation of claim 1, wherein the first halftoner, halftones gray level pixels in accordance with a line screen pattern.

3. The apparatus for halftone hybrid screen generation of claim 2, wherein the second halftoner, halftones gray level pixels in accordance with a high addressability halftone screen pattern.

4. The apparatus for halftone hybrid screen generation of claim 2, wherein the first halftoner utilizes a pulse width modulator.

5. The apparatus for halftone hybrid screen generation of claim 2, wherein the first halftoner utilizes a pulse width position modulator.

6. A method for mixing multiple halftone types within an image, comprising:
    receiving, a plurality of video signals corresponding to gray scale pixel data;
    segmenting, the gray scale pixel data to identify pictorial information as differentiated from text information;
    thresholding the gray scale pixel data identified as pictorial information so as to identify the high and low image density areas;
    tagging, a given pixel of data as based upon the result of the thresholding step with one tag result for the gray scale pixel data identified as high and low density areas in pictorial information and another tag result for all other gray scale pixel data;
    selecting, the type of halftone treatment for the given pixel of data as based upon its tag;
    modulating a video pulse in accordance with the selected halftone treatment and the given pixel data value.

7. The method for mixing multiple halftone types within an image of claim 6, wherein the halftone treatment type for selection includes high addressability clustered dot and high addressability line screen halftones.

8. The method for mixing multiple halftone types within an image of claim 6, wherein the modulating step is performed with pulse width position modulation.

9. The method for mixing multiple halftone types within an image of claim 6, wherein the modulating step is performed with pulse width modulation.

* * * * *